Figure 1:
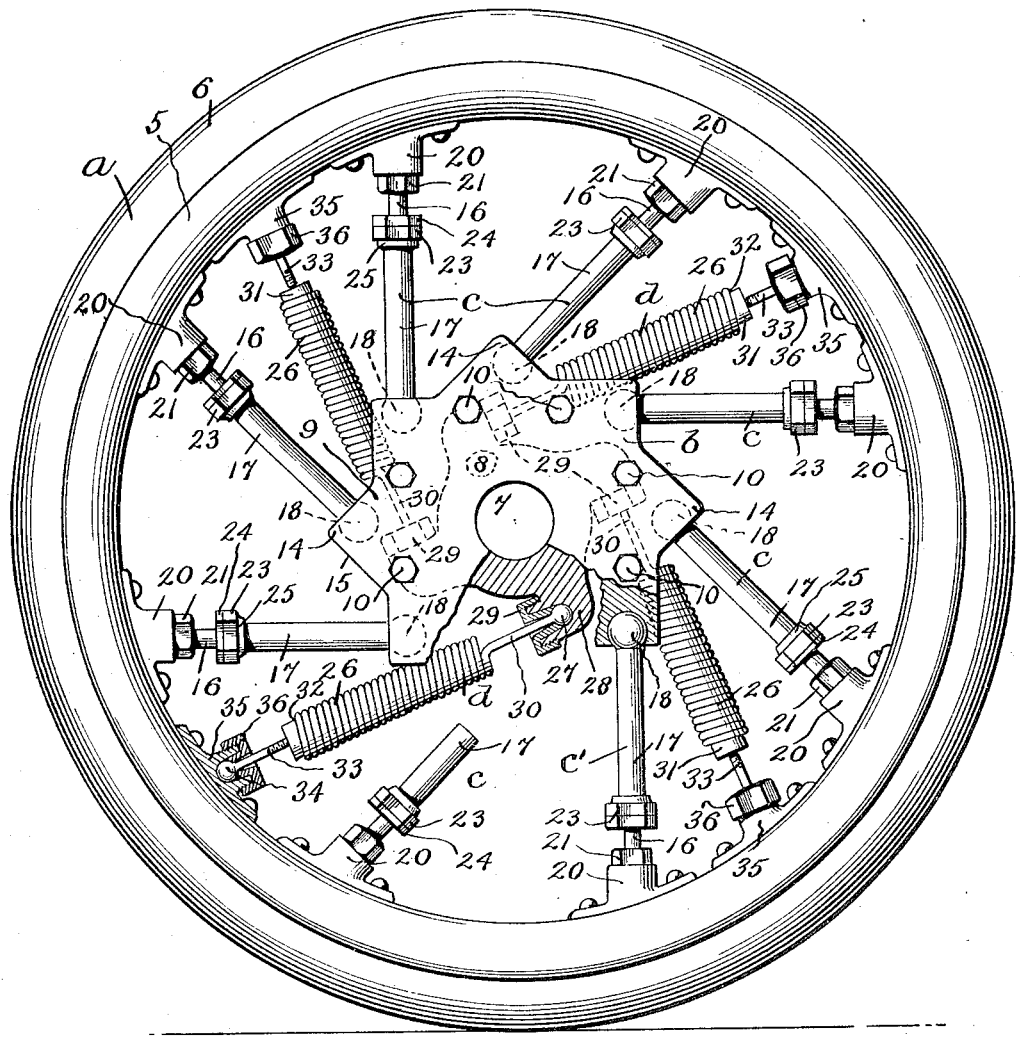

O. C. KOCH.
SPRING WHEEL.
APPLICATION FILED DEC. 31, 1913.

1,133,973.

Patented Mar. 30, 1915.
2 SHEETS—SHEET 1.

Witnesses
C. James Cronin
M. E. Laughlin

Inventor
Otto C. Koch
By Victor J. Evans
Attorney

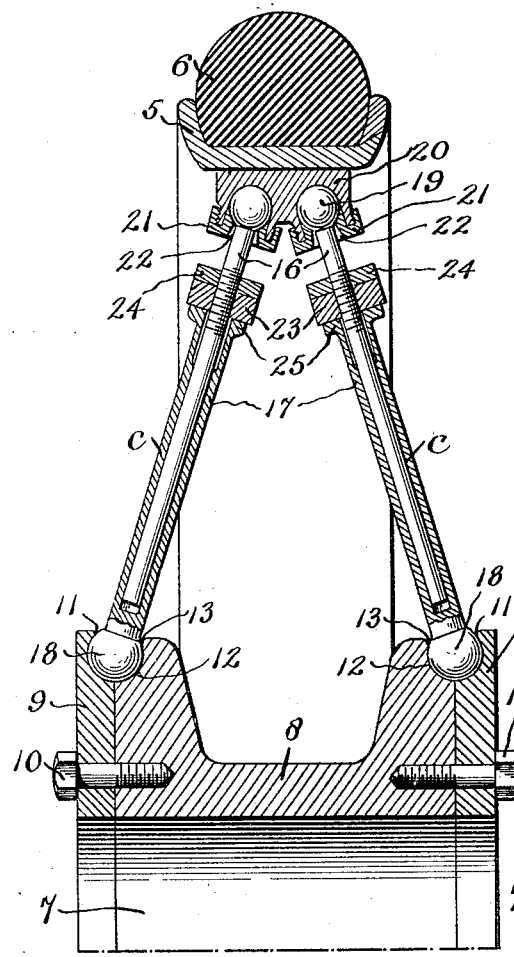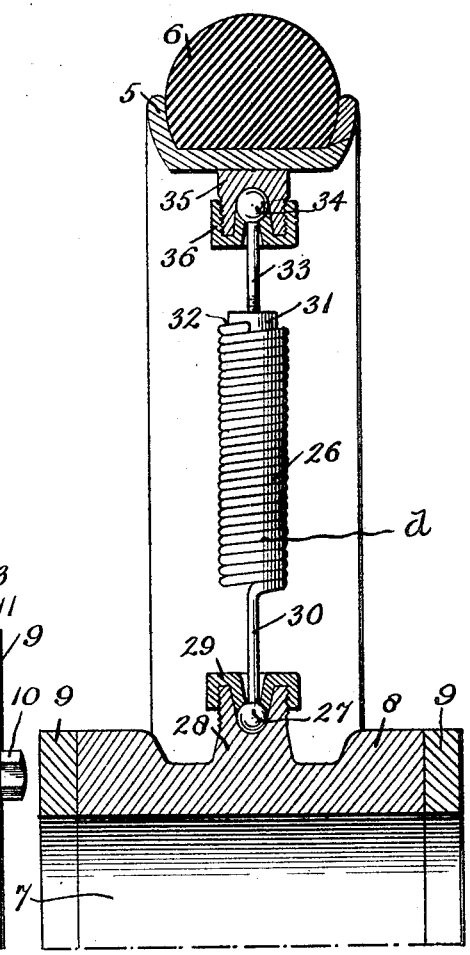

UNITED STATES PATENT OFFICE.

OTTO C. KOCH, OF BAYONNE, NEW JERSEY.

SPRING-WHEEL.

1,133,973.  Specification of Letters Patent.  Patented Mar. 30, 1915.

Application filed December 31, 1913. Serial No. 809,704.

*To all whom it may concern:*

Be it known that I, OTTO C. KOCH, a citizen of the United States of America, residing at Bayonne, in the county of Hudson and State of New Jersey, have invented new and useful Improvements in Spring-Wheels, of which the following is a specification.

The general objects of this invention are to refine the construction of that form of vehicle-wheels known generally as spring-wheels; and to dispense with the pneumatic tires and shock absorbers usually provided in motor vehicles and the like. And to these ends the invention resides in a plurality of telescoping spokes tangentially mounted on the hub of a wheel, and a plurality of resilient elements also mounted tangentially on the hub, and connecting the hub with the rim of the wheel.

Other objects will appear and be better understood from that embodiment of my invention of which the following is a specification, reference being had to the accompanying drawings forming part hereof, in which:—

Figure 1 is a side elevational view of the wheel with a portion broken away. Fig. 2 is an enlarged detail cross sectional view of the wheel showing the telescoping spokes. Fig. 3 is an enlarged detail cross-sectional view showing the resilient elements.

The wheel indicated in the drawings by *a* consists of the hub *b*, the spokes *c* and the spring-elements *d;* the spokes obviously carrying the rim 5 upon which is mounted a solid tire 6 made of rubber or some like material. The hub *b* is provided with a bore 7 in which is adapted to be journaled the axle of the vehicle (not shown). The hub is formed of a middle portion 8 and side plates 9—9; the plates are secured to the middle portion by bolts 10—10, and are provided with recesses 11—11 which coöperate with recesses 12—12 in the middle portion to form sockets 13—13 for receiving the ends 18 of the spokes *c*. It will be seen by referring to Fig. 1 that the hub is substantially star-shaped, and the purposes of this will be hereinafter fully explained.

The spokes *c* as shown in Fig. 1, carry the rim 5 and are mounted tangentially on the hub. They are not in diametric alinement but are positioned off-center. In the present form of the invention, eight spokes are shown, (though it is to be understood that the number of spokes is not limited) and it will be noted that alternating spokes are set at right angles to each other. The plates, as above mentioned are star-shaped, and as eight spokes are used, the plates are in the form of an eight-pointed star, wherein the apex angles 14 of the points are equal to ninety degrees or a right angle, and obviously each of the branches 15 of the star has a spoke positioned at right angles to one of its sides, the spoke-sides being homologous in all the branches.

The spokes are arranged in pairs in the cross section of the wheel and are positioned in echelon, as shown in Fig. 2. Each of the spokes consists of a rod 16 slidingly fitted in a sleeve 17 which has a ball end or knuckle 18 fitted in the socket 13 of the hub. The rod 16 in like manner has a ball end 19 fitted in a socket 20 carried by the rim of the wheel; the ball is retained in place by a bushing 21 which is screw-threaded on the socket and is provided with a tapering bore 22 which allows the oscillation of the rod 16. A collar 23 is positioned on the rod adjacent to the upper end thereof and is adjusted longitudinally on the rod by means of screw-threads; in order to secure the collar in a pre-determined location, a second collar 24 is provided and manifestly each will bind the other. These collars are provided so as to limit the progression of the rod into the sleeve, as the shoulder 25 of the sleeve will contact with the collars and by adjusting the collars along the rod, the length of the spoke when telescoped may be adjusted. It will be noted, however, that the action of the spring elements *d* will be to keep the spokes telescoped, and upon a tensile force being applied to the springs, the action of the springs will be to collapse the spokes. By virtue of the ball and socket connection, the action of the spokes is universal.

The resiliency in the elements *d* is effected by the coil springs 26; this spring has a ball 27 mounted at its inner end, which is fitted in a socket 28 in the middle portion 8 of the hub, and is retained therein by means of the bushing 29. This bushing is similar in structure to the previously described bushing 21, in that it is screw-threaded onto the socket and is provided with a tapering bore, whereby the shank 30 of the spring may oscillate.

A plug 31 is fitted within the outer end 32 of the spring, and is secured therein. A rod 33 is centrally disposed on the plug and is screw-threaded thereon so that it may be longitudinally adjusted in relation to the spring; the rod is provided with a ball end 34, which is fitted in a socket 35 carried by the rim of the wheel and is retained therein by a bushing 36 screw-threaded on the socket. This bushing also is tapered-bored so that the rod may move laterally. The rod 33 may be adjusted, as stated and so the tension of the spring may be regulated. Thus both the spring and the spokes may be adjusted so that any pre-determined weight may be carried non-rigidly and yet not have too much elasticity in the wheels. This is in the case where the loads on the wheels vary. As a sudden weight is applied to the vehicle upon which the wheel is mounted, such as from a bounding shock or the like, the force of the shock is distributed to the wheels by the axles which tend to bear downwardly on the hub. In the present instance, the force likewise tends to force the hub downwardly, but instead of the force continuing along the spokes to the rim, the force is caught in the hub. It will be seen in Fig. 1, that the spoke $c'$ is not in alinement with the axle of the vehicle (which would be journaled in the hub) and upon a force being applied to the hub, the hub would swing counter-clockwise with the end 18 of the spoke as a pivot. Obviously, this action would tend to extend the springs as they are positioned tangentially on the hub, and also extend the uppermost spokes. Thus it will be seen that the force of the shock is distributed in a rotary motion which absorbs the force gradually.

What is claimed as new is:

A wheel comprising a rim and a hub which is star shaped in end elevation, said hub being provided at the sides of its pointed portions with sockets, longitudinally extensible spokes having universal joint connection with the rim and provided at their ends with balls which are received in the sockets of the pointed portions of the hub, said spokes being arranged in pairs the inner ends of the members of which are connected with the opposite ends of the hub, the members of the pairs of spokes converging toward each other at their outer ends and being connected with the rim, and springs connected with the rim and the hub and lying in planes between the members of the pairs of spokes and being greater in length than the spokes.

In testimony whereof I affix my signature in presence of two witnesses.

OTTO C. KOCH.

Witnesses:
 MYRTLE A. REED,
 GEORGE E. GRISWOLD.

Copies of this patent may be obtained for five cents each, by addressing the "Commissioner of Patents, Washington, D. C."